United States Patent [19]
Lawrence

[11] Patent Number: 5,819,167
[45] Date of Patent: Oct. 6, 1998

[54] DIVERSITY RECEIVER WITH IMPROVED SENSITIVITY

[75] Inventor: Thomas William John Lawrence, Cambridge, Great Britain

[73] Assignee: Nokia Telecommunications Oy, Espoo, Finland

[21] Appl. No.: 602,816

[22] PCT Filed: Aug. 15, 1994

[86] PCT No.: PCT/GB94/01785

§ 371 Date: Jun. 7, 1996

§ 102(e) Date: Jun. 7, 1996

[87] PCT Pub. No.: WO95/06366

PCT Pub. Date: Mar. 2, 1995

[30] Foreign Application Priority Data

Aug. 27, 1993 [GB] United Kingdom .................... 9317899

[51] Int. Cl.⁶ ................................ H04B 1/10; H04B 7/08
[52] U.S. Cl. .................. 455/254; 455/234.2; 455/277.2; 455/561
[58] Field of Search ....................................... 455/254, 257, 455/134, 234.2, 233.1, 242.1, 101, 561, 226.2, 63, 296, 277.1, 277.2, 132–141; 375/345, 346; 370/347, 348, 252, 332

[56] References Cited

U.S. PATENT DOCUMENTS

| 3,831,095 | 8/1974 | Mounce | 455/254 |
| 4,969,207 | 11/1990 | Sakamoto et al. | 455/135 |
| 5,119,501 | 6/1992 | Perry et al. | 455/134 |
| 5,203,026 | 4/1993 | Ekelund | 455/277.1 |
| 5,361,404 | 11/1994 | Dent | 455/277.2 |

FOREIGN PATENT DOCUMENTS

| 0454368 A2 | 10/1991 | European Pat. Off. . |
| 0455388 A2 | 11/1991 | European Pat. Off. . |
| 3-120915 | 5/1991 | Japan ..................... 455/254 |

*Primary Examiner*—Reinhard J. Eisenzopf
*Assistant Examiner*—Lester G. Kincaid
*Attorney, Agent, or Firm*—Perman & Green, LLP

[57] ABSTRACT

A radio receiving apparatus has a main receiver (10) and a diversity receiver (12). The main and the diversity receivers are linked by a mute logic (34) which is capable of applying a mute signal to either receiver in order to reduce the sensitivity of that receiver. Receiver sensitivity is reduced in order to prevent a comparatively strong received signal causing ringing (persistence of vibration) in the receiver filter.

4 Claims, 2 Drawing Sheets

DIVERSITY RECEIVER WITH IMPROVED SENSITIVITY

BACKGROUND OF THE INVENTION

This invention relates to radio receiving apparatus.

Radio Systems such as GSM/PCN (Groupe Systeme Mobile/Personal Communication Network) use time division multiple access (TTDMA) to carry several channels of information on a single radio frequency channel by sending separate bursts of information in successive time slots. When a base station receives such transmissions from several different mobile handsets some signals may be much stronger than others. These can cause the filters in the base station receiver to "ring" (ie to suffer persistence of vibration) and hence some of the signal energy can still be present in the subsequent time slot. This can cause blocking of a weak signal in the subsequent time slot and hence a degradation of the system performance. This is adjacent channel interference in the time domain.

SUMMARY OF THE INVENTION

This invention provides a way of utilising the diversity receiver often found in such systems to reduce the affect of such interference.

According to the invention radio receiving apparatus comprises a main receiver, a diverse receiver and means for altering the sensitivity of one of the receivers in dependence upon the strength of signal received by the other of the receivers.

Preferably, said means are operative to reduce the sensitivity of the diverse receiver if the strength of signal received by the main receiver exceeds a predetermined threshold and to reduce the sensitivity of the main receiver if the strength of signal received by the diverse receiver exceeds a predetermined threshold.

The radio receiving apparatus may employ time division multiple access using a plurality of time slots to constitute a frame of received information, and said means are then operative to reduce the sensitivity for a terminal part of each time slot, to prevent ringing of a filter of the corresponding receiver in the subsequent time slot.

The invention thus relies on the principle that when a strong signal is known to be present, it is less likely that the diverse receiver is contributing to the link performance since there is likely to be sufficient signal in the main receiver. Thus it is possible to reduce the sensitivity of the diverse receiver during the strong signal transmission so that in the subsequent time slot its sensitivity can be reset and the receiver used to receive a weak signal without the loss of sensitivity associated with the strong signal still ringing in the filters.

Clearly this process is symmetrical in that a strong signal in the diverse receiver would allow muting of the main receiver. Suitable logic is required to decide if and when to mute one or other receiver depending on the signal levels in each receiver.

In this way it should be possible to reduce the adjacent (time) channel interference.

The preferred embodiment of radio receiving apparatus comprises two receivers, a main receiver and a diversity receiver. The gain of each is controlled firstly to provide a constant signal level at the detector as is usual in a receiver and secondly to reduce the sensitivity of the diversity receiver when the signal strength in the time slot is sufficient for the main receiver to provide adequate reception.

BRIEF DESCRIPTION OF THE DRAWING

Radio receiving apparatus according to the invention will now be described, by way of example, with reference to the accompanying drawing wherein.

DETAILED DESCRIPTION OF THE INVENTION

Figure 1:
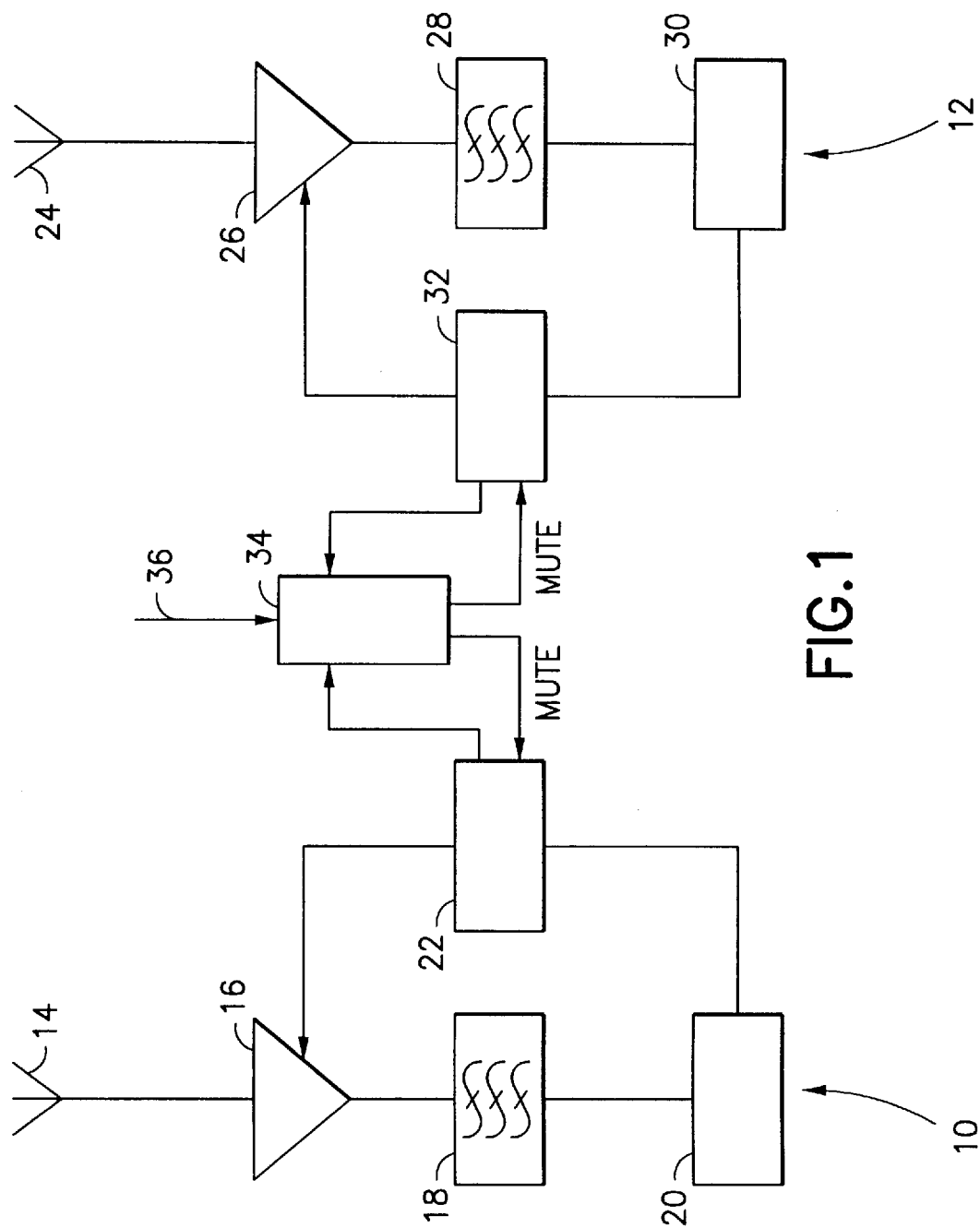
FIG. 1 shows the apparatus in block circuit form.

The apparatus is incorporated in a base station and includes a main receiver 10 and a diversity receiver 12. The main receive path includes a main receive antenna 14, an automatic gain control circuit 16, a filter 18 and a detector 20 the output of which feeds a further automatic gain control circuit 22. The diversity receive path includes a diversity antenna 24 and components 26, 28, 30 and 32 corresponding to the respective components 16, 18, 20 and 22 of the main receive path.

The main and diversity receive paths are linked by a mute logic circuit 34 which receives level signals from both AGCs 22 and 32 and, under certain conditions, feeds mute signals (ie signals which reduce sensitivity) to the main and diverse receivers.

The radio receiving apparatus employs TDMA so that the received information is contained in a series of time slots, with eight such time slots forming a frame. Information from remote mobile handsets is received at the base station in different time slots. For example, a comparatively close handset may be transmitting information to the base station in slot 1 and providing a comparatively strong signal, whilst a comparatively distant handset may be transmitting information to the base station in slot 2 and providing a comparatively weak signal.

To avoid the problem of the filters in the receivers ringing as a result of the strong signal from the nearer base station, the mute logic reduces the sensitivity of one of the receivers so that the receiver with the reduced sensitivity no longer rings and is able to detect the weak signal in time slot 2 with greater fidelity.

Shortly after the commencement of each time slot, the signal levels in the main receiver and in the diverse receiver are monitored by the mute logic 34. A timing signal 36 is fed to the mute logic for this purpose. If the signal level in either receiver exceeds a predetermined threshold, the mute logic 34 applies a mute signal to reduce the sensitivity of the other receiver for the remainder of the time slot, thereby to prevent ringing and to place the other receiver in condition to detect a comparatively weak signal in the subsequent time slot.

For example, when the detected signal level in the main receiver exceeds the threshold, the mute signal is sent to the diversity receiver 12 to protect the filter of the diversity receiver from large signals which might continue ringing in the next time slot. Conversely, a mute signal is sent to the main receiver 10 when the signal level in the diverse receiver exceeds a predetermined level.

Figure 2:
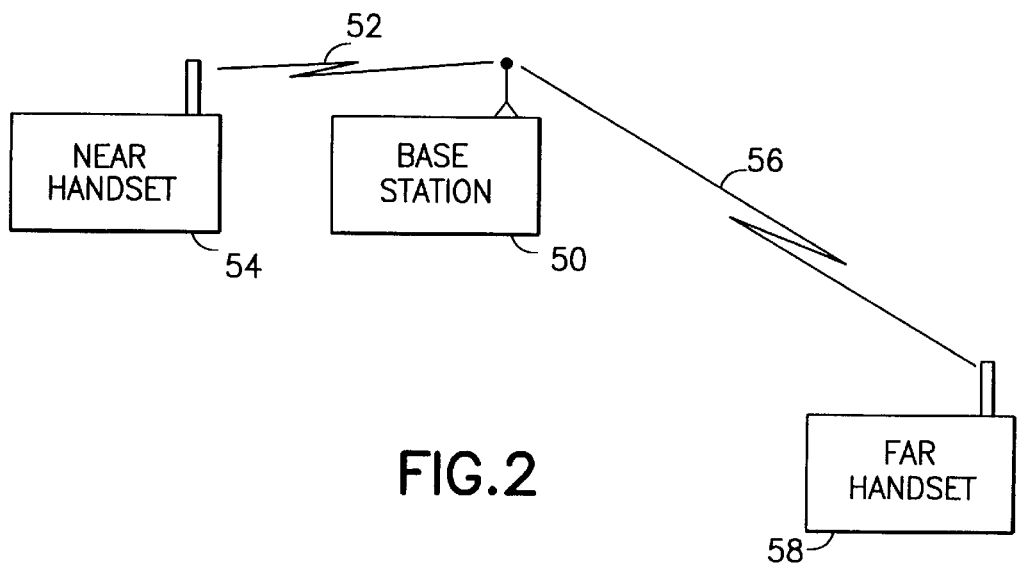
FIG. 2 shows locations of handsets relative to a base station.
Figure 3:
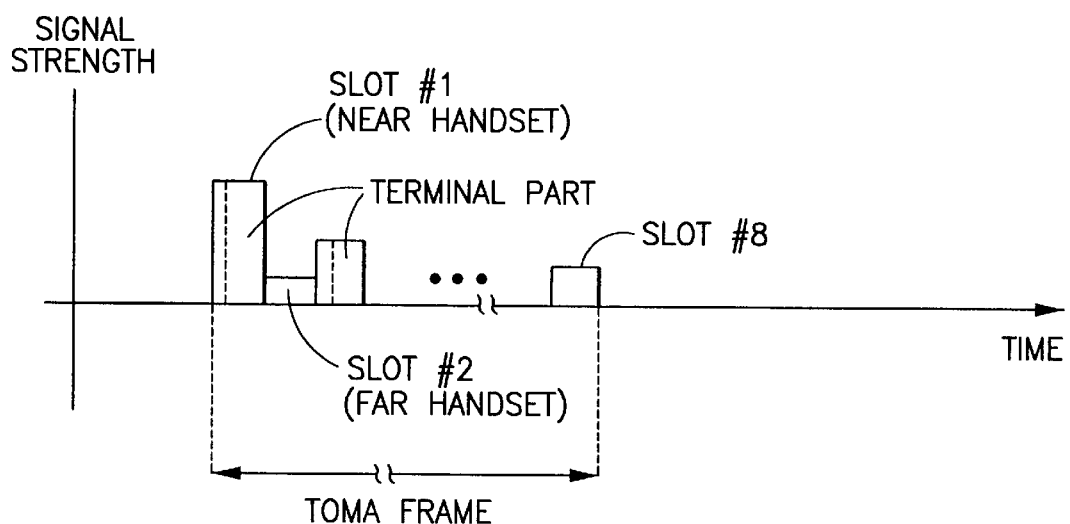
FIG. 3 shows a TDMA time frame relating to transmission of signals between the handsets and the base station of FIG. 2.

In FIG. 2, a base station 50 communicates via a communication link 52 with a first handset 54, and via a communication link 56 with a second handset 58. The first handset 54 is relatively near to the base station 50, and the second handset 58 is relatively far from the base station 50. The communication links 52 and 56 operate with TDMA transmission, depicted in the graph of FIG. 3, wherein the vertical axis represents signal strength and the horizontal axis represents time. The TDMA frame is shown with eight successive time slots wherein, in each of the time slots, a portion of the slot is designated as a terminal part of the slot. The first slot shows a relatively large signal strength for communication with the near handset, and the second slot shows a relatively small signal strength for communication with the far handset.

I claim:

1. Radio receiving apparatus operative during successive time slots of a time-division multiple-access transmission sequence, a succession of said time slots providing signals for respective ones of a plurality of signal channels, each of said time slots including a first part and a terminal part thereafter, said apparatus comprising:

a main receiver and a diversity receiver having respectively a main antenna and a diversity antenna, said main receiver and said diversity receiver receiving the signals of said plurality of signal channels; and means for altering the sensitivity of one of the receivers for the terminal part of one of said time slots in dependence upon the strength of signal received in the first part of said one time slot by the other of the receivers, said altering means being operative for altering the sensitivity in said one receiver in said one of said time slots for one of said channels, said altering occurring prior to a following time slot for a second of said channels of said plurality of signal channels to inhibit a ringing within said one receiver during said following time slot of said second channel.

2. Radio receiver apparatus according to claim 1, wherein said altering means are operative to reduce the sensitivity of the diversity receiver when the strength of signal received by the main receiver exceeds a predetermined threshold and to reduce the sensitivity of the main receiver when the strength of signal received by the diversity receiver exceeds a predetermined threshold.

3. Radio receiving apparatus according to claim 2, wherein the radio receiving apparatus employs time division multiple access using a plurality of said time slots to constitute a frame of received information and said altering means are operative to reduce the sensitivity for a terminal part of an individual one of said time slots, to prevent said ringing of a filter of the corresponding receiver in the subsequent time slot.

4. Radio receiving apparatus according to claim 1 wherein the apparatus is further incorporated in the base station of a radio telephone system.

* * * * *